(12) United States Patent
Takagi et al.

(10) Patent No.: US 11,032,998 B2
(45) Date of Patent: Jun. 15, 2021

(54) TOILET FOR ANIMAL

(71) Applicant: UNICHARM Corporation, Ehime (JP)

(72) Inventors: Chiyo Takagi, Kagawa (JP); Shinya Kaneko, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 127 days.

(21) Appl. No.: 15/749,120

(22) PCT Filed: Jun. 3, 2016

(86) PCT No.: PCT/JP2016/066561
§ 371 (c)(1),
(2) Date: Jan. 31, 2018

(87) PCT Pub. No.: WO2017/022319
PCT Pub. Date: Feb. 9, 2017

(65) Prior Publication Data
US 2018/0220619 A1 Aug. 9, 2018

(30) Foreign Application Priority Data
Jul. 31, 2015 (JP) .............................. JP2015-152402

(51) Int. Cl.
*A01K 1/01* (2006.01)
(52) U.S. Cl.
CPC ................................ *A01K 1/0114* (2013.01)
(58) Field of Classification Search
CPC .... A01K 1/035; A01K 1/0114; A01K 1/0107; A01K 1/015; A01K 1/03; A01K 1/033; A01K 1/0151
See application file for complete search history.

(56) References Cited

U.S. PATENT DOCUMENTS 4,362,128 A * 12/1982 Downey .............. A01K 31/007
119/528
4,505,226 A * 3/1985 Carlson ................ A01K 1/0114
119/166
(Continued)

FOREIGN PATENT DOCUMENTS

CN 1640246 A 7/2005
EP 1790219 A1 5/2007
(Continued)

OTHER PUBLICATIONS

Office Action in JP Application No. 2015-152402, dated Jul. 17, 2018, 7pp.
(Continued)

*Primary Examiner* — Magdalena Topolski
*Assistant Examiner* — Katelyn T Truong
(74) *Attorney, Agent, or Firm* — Hauptman Ham, LLP

(57) ABSTRACT

A toilet for an animal having an up-down direction includes an upper container including a bottom part in which a plurality of holes that penetrate in the up-down direction are formed, and a lower container provided below the upper container. An outer periphery of each of the holes being surrounded with cross ribs along a direction intersecting with the up-down direction and longitudinal ribs along a direction intersecting with the up-down direction and the cross ribs. An uppermost part of the longitudinal ribs is higher than an uppermost part of the cross ribs. A part of the cross ribs connected to the longitudinal ribs being provided with an upper-side inclined surface inclined obliquely downward from the longitudinal ribs.

14 Claims, 11 Drawing Sheets

(56) References Cited

U.S. PATENT DOCUMENTS

| | | | | | |
|---|---|---|---|---|---|
| 5,572,950 | A | * | 11/1996 | O'Rourke | A01K 1/0107 119/165 |
| 5,598,810 | A | * | 2/1997 | Lawton, III | A01K 1/0114 119/166 |
| 6,047,663 | A | * | 4/2000 | Moreau | A01K 1/0151 119/526 |
| 2005/0028745 | A1 | * | 2/2005 | Baillie | A01K 1/0107 119/165 |
| 2005/0183672 | A1 | * | 8/2005 | Lewis, II | A01K 1/0107 119/165 |
| 2007/0068461 | A1 | * | 3/2007 | Hill | A01K 1/0107 119/166 |
| 2014/0251224 | A1 | * | 9/2014 | Yamamoto | A01K 1/0114 119/165 |
| 2018/0014509 | A1 | * | 1/2018 | Kwak | A01K 23/005 |
| 2018/0192610 | A1 | * | 7/2018 | Petty | A01K 1/0114 |
| 2019/0021273 | A1 | * | 1/2019 | Hirata | A01K 29/005 |
| 2019/0191662 | A1 | * | 6/2019 | Takada | A01K 1/011 |
| 2019/0343066 | A1 | * | 11/2019 | Fan | A01K 1/0114 |
| 2019/0373844 | A1 | * | 12/2019 | Ward | A01K 1/0107 |

FOREIGN PATENT DOCUMENTS

| | | |
|---|---|---|
| JP | 55-41148 U | 3/1980 |
| JP | 61-2052 U | 1/1986 |
| JP | 2005-6605 A | 1/2005 |
| JP | 2005-287367 A | 10/2005 |
| JP | 2006-67920 A | 3/2006 |
| JP | 3138034 U | 12/2007 |
| JP | 2009-136273 A | 6/2009 |
| JP | 2012-213362 A | 11/2012 |
| JP | 2014-195430 A | 10/2014 |
| JP | 2014-195776 A | 10/2014 |
| WO | 2006/025435 A1 | 3/2006 |
| WO | 2013/008532 A1 | 1/2013 |

OTHER PUBLICATIONS

Extended European Search Report in EP Application No. 16832598.3, dated Jul. 6, 2018, 8pp.
Office Action in EP Application No. 16832598.3, dated Jun. 19, 2019, 7pp.
International Search Report in PCT/JP2016/066561, dated Aug. 16, 2016, 4pp.
Written Opinion in PCT Application No. PCT/JP2016/066561, dated Aug. 16, 2016, 21pp.
Office Action in AU Application No. 2016302116, dated Feb. 14, 2020, 4pp.
Office Action in CN Application No. 201680044699.9, dated Jun. 23, 2020, 15pp.
Office Action in EP Application No. 16832598.3, dated Jun. 5, 2020, 4pp.
Office Action in CN Application No. 201680044699.9, dated Feb. 20, 2021 12pp.

* cited by examiner

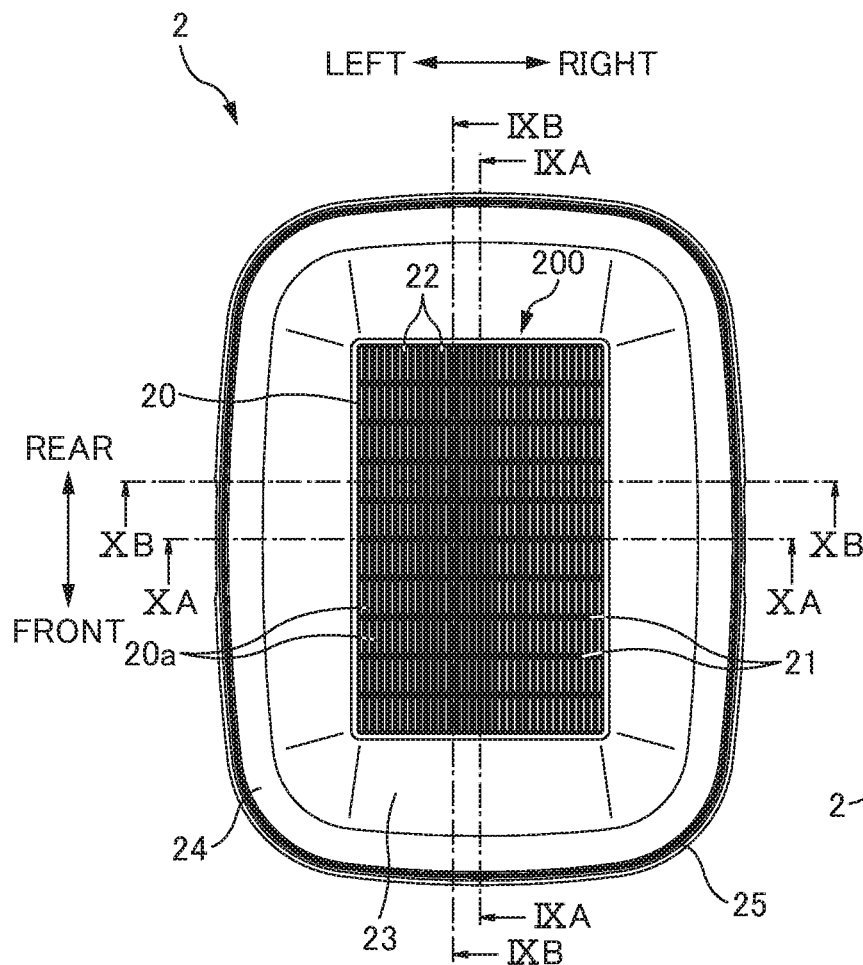
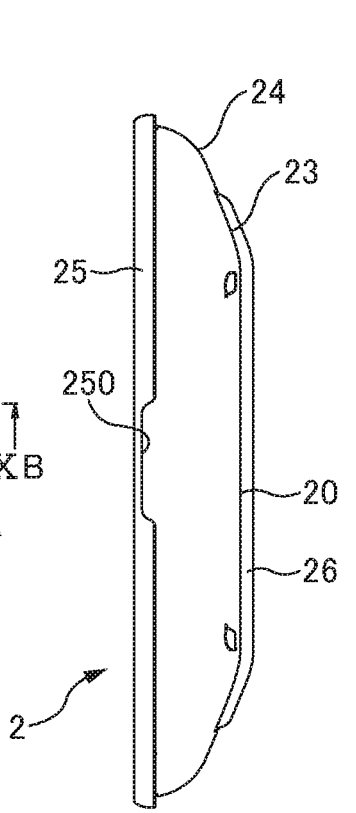
FIG. 3A
FIG. 3B
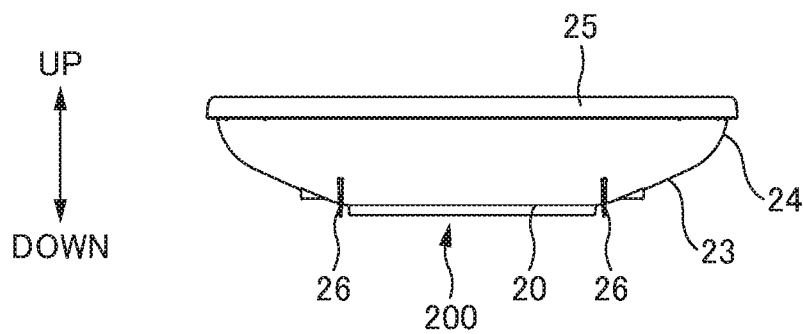
FIG. 3C

TOILET FOR ANIMAL

RELATED APPLICATIONS

The present application is a national phase of International Application Number PCT/JP2016/066561, filed Jun. 3, 2016, which claims priority to Japanese Application Number 2015-152402, filed Jul. 31, 2015.

TECHNICAL FIELD

The present invention relates to toilets for animals.

BACKGROUND ART

A toilet which is used by animals such as cats being reared indoors is conventionally known as a toilet for an animal. For example, PTL 1 discloses a toilet for pets in which a drainboard including a large number of holes through which urine or the like passes partitions a toilet main body up and down, an excrement treatment material is placed on an upper layer part, and a urine absorber is placed on a lower layer part.

This drainboard is formed with a large number of holes by crossing a plurality of lengthwise ribs disposed at intervals over a plurality of crosswise ribs disposed at intervals. In an up-down direction of the drainboard, a position of an uppermost part of the lengthwise rib is the same as a position of an uppermost part of the crosswise rib. Furthermore, an angle of a part where the lengthwise rib is connected to the crosswise rib (an angle on a vertical plane) is orthogonal.

CITATION LIST

Patent Literature

[PTL 1] Japanese Unexamined Patent Application Publication No. 2006-67920

SUMMARY OF INVENTION

Technical Problem

It is difficult to wash the toilet for an animal described in PTL 1 because a brush or the like catches on the crosswise rib when the drainboard is cleaned by brushing and the like along the lengthwise rib, for example. Further, since the angle of the part where the lengthwise rib is connected to the crosswise rib (the angle on the vertical plane) is orthogonal, grime such as urine is likely to accumulate on this part.

The present invention has been made in view of the above circumstances and an objective thereof is to provide a toilet for an animal where grime such as urine is less likely to accumulate and facilitates cleaning.

Solution to Problem

A principal aspect of the present invention to achieve the above advantage is a toilet for an animal having an up-down direction including an upper container including a bottom part in which a plurality of holes that penetrate in the up-down direction are formed, and a lower container provided below the upper container. An outer periphery of each of the holes being surrounded with first ribs along a direction intersecting with the up-down direction and second ribs along a direction intersecting with the up-down direction and the first ribs. An uppermost part of the second ribs is higher than an uppermost part of the first ribs. A part of the first ribs connected to the second ribs is provided with an inclined surface inclined obliquely downward from the second ribs. Other features of the present invention will be made clear through the present specification with reference to the accompanying drawings.

Advantageous Effects of Invention

With the present invention, grime such as urine is less likely to accumulate and facilitates cleaning.

BRIEF DESCRIPTION OF DRAWINGS

FIG. 3 shows one configuration example of an upper container, FIG. 3A is a top view, FIG. 3B is a right side view, and FIG. 3C is a front view.

FIG. 7 shows one configuration example of cross ribs and longitudinal ribs.

FIG. 11 shows states of the cross ribs and the longitudinal ribs when a force is applied in an up-down direction.

DESCRIPTION OF EMBODIMENTS

Figure 1:
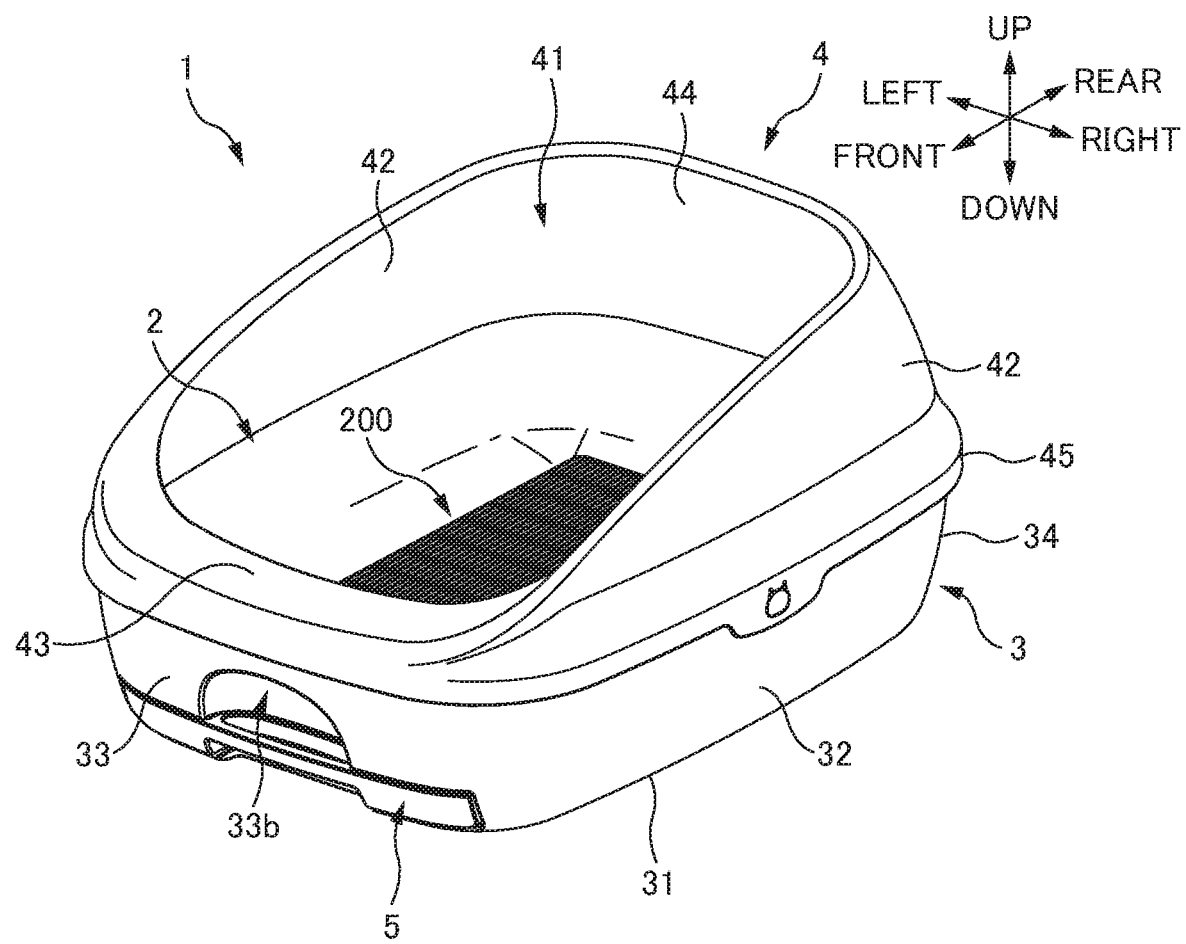
FIG. 1 is a perspective view that shows one configuration example of a toilet for an animal according to an embodiment of the present invention.

At least the following matters will be made clear by the description in the present specification and the accompanying drawings.

A toilet for an animal will become clear, the toilet for an animal having an up-down direction includes an upper container including a bottom part in which a plurality of holes that penetrate in the up-down direction are formed, and a lower container provided below the upper container. An outer periphery of each of the holes being surrounded with first ribs along a direction intersecting with the up-down direction and second ribs along a direction intersecting with the up-down direction and the first ribs. An uppermost part of the second ribs is higher than an uppermost part of the first ribs. A part of the first ribs connected to the second ribs is provided with an inclined surface inclined obliquely downward from the second ribs.

With such a toilet for an animal, because the part of the first ribs connected to the second ribs is provided with the inclined surface inclined obliquely downward from the second ribs, compared with a case where an angle on a vertical plane of a part where the first rib is connected to the second rib is orthogonal or acute, grime such as urine is less likely to accumulate on this part. Further, in cleaning, brushing and the like is easily performed on a boundary part between the first rib and the second rib and facilitates the cleaning.

In the above toilet for an animal, it is preferable that an upper side of the first ribs is provided with a first curved surface curving downward over between the two second ribs adjacent to one another, and a part of the first curved surface is the inclined surface.

With such a toilet for an animal, since the first curved surface including the inclined surface provided on the part connected to the second rib is provided on the upper side of the first rib, the upper side of the first rib becomes a smooth surface. Thus, the grime such as urine is further less likely to accumulate. Further, in cleaning, brushing and the like can be performed over the whole first curved surface and facilitates the cleaning.

In the above toilet for an animal, it is preferable that an upper side of the second ribs is provided with a second curved surface curving upward, and the second curved surface is continuous with the inclined surface of the first ribs.

With such a toilet for an animal, since the second curved surface is provided on the upper side of the second ribs, the urine or the like is less likely to accumulate on an upper part and is likely to fall down. Then, because the second curved surface is smoothly continuously connected to the inclined surface of the first ribs, a situation where the grime such as urine accumulates on a boundary part between the second curved surface and the inclined surface can be restrained.

In the above toilet for an animal, it is preferable that the second ribs include a lower side where a dimension in a width direction intersecting with a longitudinal direction of the second ribs and the up-down direction decreases toward a lower end.

With such a toilet for an animal, on the lower side of the second rib, by decreasing the dimension in the width direction toward the lower end, the urine or the like that has gone down the second ribs accumulates on the lower end to make a droplet large, thus being likely to fall down with its own weight. This improves drainage, and the grime becomes further less likely to accumulate.

In the above toilet for an animal, it is preferable that a distance between the first ribs adjacent to one another is longer than a distance between the second ribs adjacent to one another.

With such a toilet for an animal, since the distance between the first ribs adjacent to one another is made longer than the distance between the second ribs adjacent to one another, the hole with the outer periphery surrounded by the first ribs and the second ribs will have an elongated shape along the second ribs. This facilitates the cleaning by moving a brush and the like along a longitudinal direction of this hole.

In the above toilet for an animal, it is preferable that a position in the up-down direction of the uppermost part of the second ribs is the same as a position in the up-down direction of a lowest part of an outer peripheral part provided to an outer periphery of the bottom part of the upper container continuously from the bottom part.

With such a toilet for an animal, since the uppermost part of the second rib does not protrude upward with respect to the lowest part of the outer peripheral part provided on the outer periphery of the bottom part, for example, in cleaning, even when a force is applied to a boundary part between the bottom part and the outer peripheral part from an upper side to a lower side, the force is not applied to only the second ribs, and the force is distributed and applied to the second ribs and the outer peripheral part. This can ensure strength of the bottom part.

In the above toilet for an animal, it is preferable that when the toilet for an animal is viewed along the up-down direction, the part, of the first ribs, connected to the second ribs is provided with a curved surface curving toward the second ribs.

With such a toilet for an animal, when the toilet for an animal is viewed along the up-down direction, because the part, of the first ribs, connected to the second ribs is provided with the curved surface curving toward the second ribs, the hole has a rounded shape. Thus, compared with a case where the first rib is orthogonally connected to the second rib on a horizontal surface, the grime such as urine is less likely to accumulate on this connecting part.

In the above toilet for an animal, it is preferable that the first ribs positioned in both ends of the plurality of first ribs protrude downward with respect to the other first ribs.

With such a toilet for an animal, since the first ribs positioned in both ends protrude downward than the other first ribs, in brushing and the like of the bottom part, a contamination that has passed through the hole is likely to touch the first ribs positioned in both ends to easily fall to the lower side. This can restrain scatter of the contamination.

In the above toilet for an animal, it is preferable that the upper container includes, in an outer periphery of the bottom part, an outer peripheral part provided continuously from the bottom part, a part of the outer peripheral part includes plate members along the second ribs provided in both sides of the plurality of second ribs, and the plate members protrude further downward than the first ribs positioned in both ends of the plurality of first ribs.

With such a toilet for an animal, because the plate members further protrude downward with respect to the first ribs positioned in both ends, for example, even when the upper container is placed on a floor, the bottom part does not directly contact the floor because end parts of the plate members contact the floor. This can restrain the grime attached to the bottom part from attaching to the floor.

In the above toilet for an animal, it is preferable that a dimension of a part in each of the first ribs whose length in the up-down direction is shortest is larger than a half of a dimension of a part in each of the second ribs whose length in the up-down direction is longest.

With such a toilet for an animal, because in the first ribs, the dimension of the part whose length in the up-down direction is shortest is made larger than the half of the dimension of the part whose length in the up-down direction is longest, while easiness of brushing and the like in cleaning is maintained, damage of this shortest part can be restrained by the force applied in the up-down direction.

In the above toilet for an animal, it is preferable that the part, of each of the first ribs, connected to each of the second ribs is provided with a lower-side inclined surface inclined obliquely upward from the second ribs.

With such a toilet for an animal, because the part of the first ribs connected to the second ribs is provided with the lower-side inclined surface inclined obliquely upward from the second ribs, grime such as urine is less likely to accumulate on this part compared with a case where the angle on the vertical plane of the part where the first rib is connected to the second rib is orthogonal or acute, even in a lower side of the bottom part. Further, in cleaning, also on the lower side of the bottom part, brushing and the like is easily performed on the boundary part between the first ribs and the second ribs and facilitates the cleaning.

In the above toilet for an animal, it is preferable that a lower side of the first ribs is provided with a lower-side curved surface curving upward over between the two second ribs adjacent to one another, and a part of the lower-side curved surface is the lower-side inclined surface.

With such a toilet for an animal, because the lower side of the first ribs is provided with the lower-side curved surface including the lower-side inclined surface provided on the part connected to the second ribs, the lower side of the first rib also becomes a smooth surface. Thus, the grime such as urine is further less likely to accumulate. Further, in cleaning, brushing and the like can be performed over the whole lower-side curved surface and facilitates the cleaning on the lower side along with the upper side of the bottom part.

Present Embodiment

A toilet for an animal according to an embodiment of the present invention is used by animals such as cats being reared indoors, for example. The "animals" in the present specification include not only so-called pets such as a cat, dog, rabbit and hamster, but also a baby of a tiger or lion and the like.

As an example, usage of the toilet for an animal in a case where the animal is a cat is as follows. First, the cat enters the toilet for an animal and urinates or defecates from above excrement treatment material called, for example, cat litter, sands or the like. Then, the cat kicks the excrement treatment material with his/her feet and hides the excrement. Owners exclude a soiled part of the excrement treatment material together with the excrement from the toilet for an animal, and new excrement treatment material is supplied for the excluded amount.

<Overall Configuration of Toilet for an Animal 1>

The overall configuration of a toilet for an animal 1 will be described with reference to FIG. 1 to FIG. 6.

Figure 2:
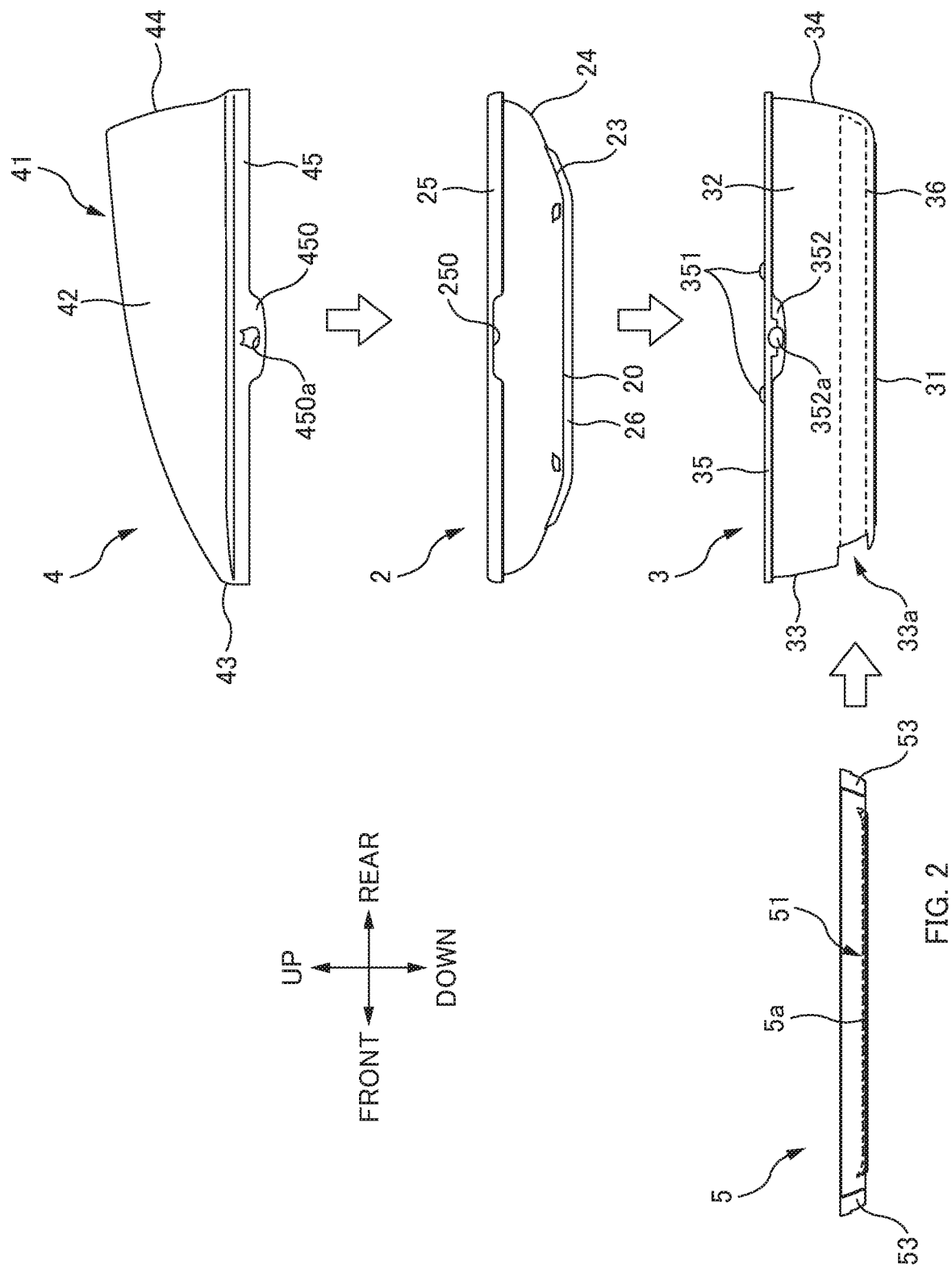
FIG. 2 is an exploded explanatory view of a toilet for an animal.

FIG. 1 is a perspective view that shows an example of the configuration of a toilet for an animal 1 according to an embodiment of the present invention. FIG. 2 is an exploded explanatory view of the toilet for an animal 1.

This toilet for an animal 1 is placed on such as an indoor floor for use, for example, and has an up-down direction, a front-rear direction, and a right-left direction that are mutually orthogonal. In the present embodiment, the toilet for an animal 1 has a longitudinal direction in the front-rear direction and a lateral direction in the right-left direction. A side on which the toilet for an animal 1 is placed is a downward direction, and its opposite side is an upward direction.

The toilet for an animal 1 includes an upper container 2 on which a urine passing area 200 is provided, a lower container 3 provided below the upper container 2, a cover 4 on which an opening part 41 that allows an animal to enter and exit is formed, and a tray 5 housed in the lower container 3. The upper container 2, the lower container 3, the cover 4, and the tray 5 is formed by molding resin such as polyethylene (PE), polypropylene (PP), polyethylene terephthalate (PET) and the like.

An assembly method of the toilet for an animal 1 will be described with reference to FIG. 2. First, the upper container 2 is assembled to the lower container 3 from above. Next, the cover 4 is assembled from above the upper container 2 with respect to the lower container 3 that has been assembled with the upper container 2. The tray 5 is slidable with respect to the lower container 3 in the front-rear direction and is housed in the lower container 3. In the present embodiment, a direction in which the tray 5 is housed into the lower container 3 is a rear direction, and a direction in which the tray 5 is pulled out from inside the lower container 3 is a front direction.

(Configuration of Upper Container 2)

The following describes a configuration of the upper container 2 with reference to FIG. 3A, FIG. 3B, FIG. 3C, and FIG. 4 in addition to FIG. 1 and FIG. 2.

Figure 4:
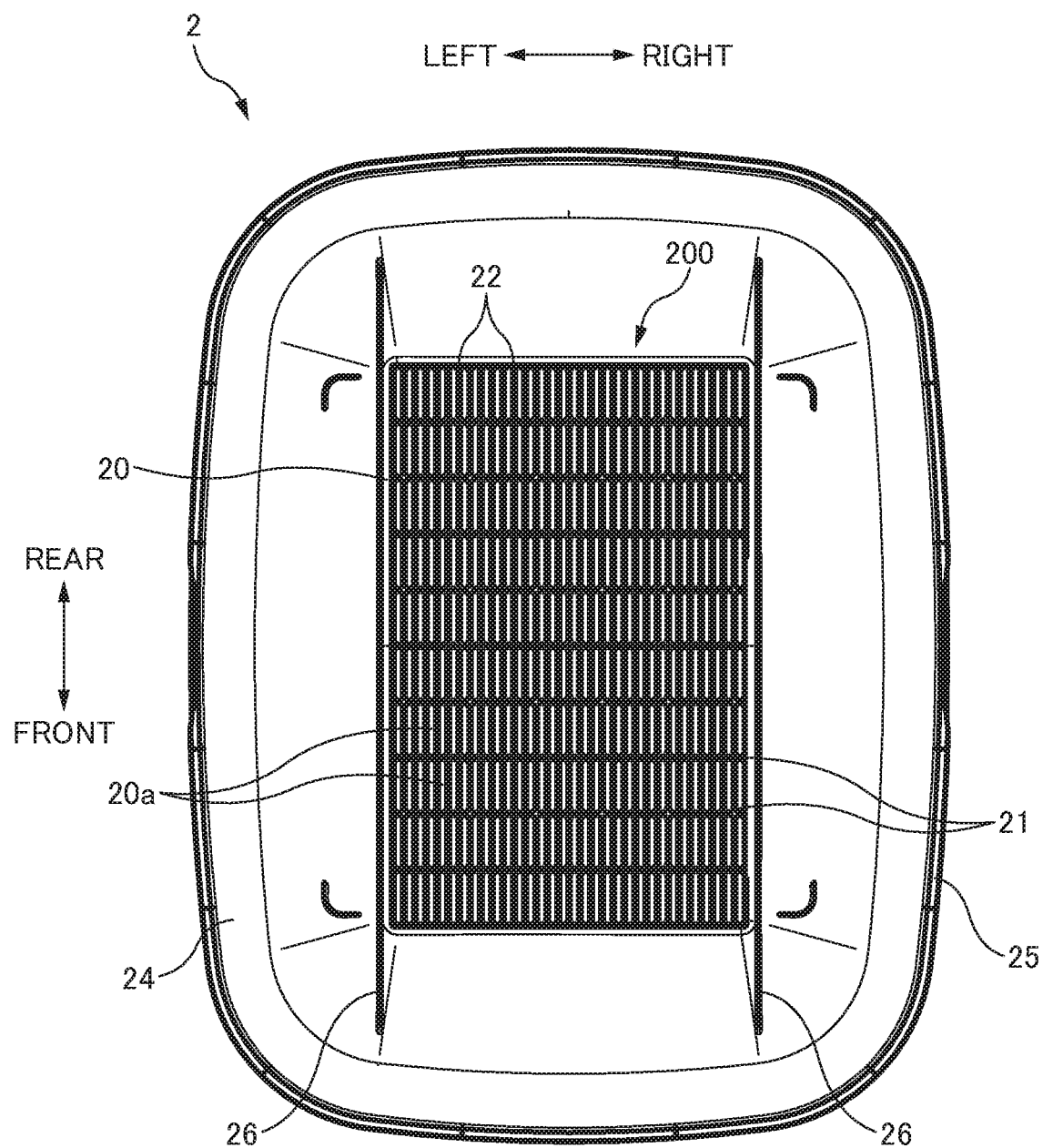
FIG. 4 is a plan view of when the upper container is viewed from a back side.

FIG. 3A, FIG. 3B, and FIG. 3C show one configuration example of the upper container 2, FIG. 3A is a top view, FIG. 3B is a right side view, and FIG. 3C is a front view. FIG. 4 is a plan view of when the upper container 2 is viewed from a back side.

As shown in FIG. 2, FIG. 3B, and FIG. 3C, the upper container 2 is a box-shaped member with an open upper side, and includes a bottom part 20 on which the urine passing area 200 is provided, an outer peripheral part 23 provided on an outer periphery of the bottom part 20, a side face 24 arranged vertically upward from the peripheral edge of the outer peripheral part 23, and a folded part 25 formed by folding back the upper end of the side face 24 downwardly.

The bottom part 20 is positioned in a lowermost position among the respective parts of the upper container 2. In the present embodiment, the bottom part 20 is, in a state where the toilet for an animal 1 is placed on the floor, a part parallel to the floor. In the urine passing area 200 of the bottom part 20, a plurality of holes 20a that penetrate in the up-down direction are formed.

The plurality of holes 20a have outer peripheries surrounded with cross ribs 21 as the first ribs along the direction intersecting with the up-down direction, and longitudinal ribs 22 as the second ribs along the direction intersecting with the up-down direction and the cross ribs 21. In this embodiment, a plurality of cross ribs 21 along the right-left direction of the toilet for an animal 1 are arranged side by side in the front-rear direction, and a plurality of longitudinal ribs 22 along the front-rear direction of the toilet for an animal 1 are arranged side by side in the right-left direction.

Note that, it is not necessary that the cross ribs 21 are along the right-left direction and the longitudinal ribs 22 are along the front-rear direction. It is only necessary the cross ribs 21 and the longitudinal ribs 22 intersect with the up-down direction, and the cross ribs 21 and the longitudinal ribs 22 intersect with one another.

As shown in FIG. 3A and FIG. 4, the urine passing area 200 has a lattice body integrally formed with the cross ribs 21 and the longitudinal ribs 22. In this embodiment, the urine passing area 200 is provided on the whole of the bottom part 20. For example, the urine passing area 200, however, may be provided in a part of the bottom part 20, or the urine passing area 200 may be provided from the bottom part 20 over the outer peripheral part 23 side.

The outer peripheral part 23 is continuously provided from the bottom part 20. In this embodiment, the outer peripheral part 23 is continuously provided from the peripheral edge of the urine passing area 200 to incline upward. As shown in FIG. 3C and FIG. 4, on a back side of the outer peripheral part 23, a plate member 26 along the longitudinal rib 22 is provided to both sides in the right-left direction of the plurality of longitudinal ribs 22 (the urine passing area 200). As shown in FIG. 3C, the pair of plate members 26 protrudes downward, and, for example, has a function as legs when the upper container 2 is placed on the floor.

As shown in FIG. 2 and FIG. 3B, the folded part 25 is formed with notches 250 in respective positions opposing in the right-left direction. Owners and the like can put his/her fingers on the notches 250 when assembling the upper container 2 to the lower container 3 and removing the upper container 2 from the lower container 3. Note that, only one notch 250 of the two notches 250 is shown in FIG. 2 and FIG. 3B.

(Configuration of Lower Container 3)

The following describes a configuration of the lower container 3 with reference to FIG. 1 and FIG. 2.

The lower container 3 is a box-shaped member with an open upper side, similarly to the upper container 2, and includes a bottom part 31, side wall parts 32 arranged vertically upward from both ends in the right-left direction of the bottom part 31, a front wall part 33 arranged vertically upward from a front end of the bottom part 31, a rear wall part 34 arranged vertically upward from a rear end of the bottom part 31, and a folded part 35 formed such that upper ends of the side wall parts 32, the front wall part 33, and the rear wall part 34 are folded back downwardly.

As shown in FIG. 2, inside the lower container 3, a housing space 36 for housing the tray 5 is formed. Note that, in FIG. 2, the housing space 36 is shown by a broken line. In the front wall part 33, an inserting/removing port 33a is formed to insert or remove the tray 5 in or out of the housing space 36. Further, as shown in FIG. 1, the front wall part 33 is formed with a recessed part 33b for allowing hands not to touch the front wall part 33 when grasping the tray 5 with hands.

The folded part 35 is formed with a fitting piece 352, provided with a projecting part 352a, that overhangs downwardly, in respective positions opposing each other in the right-left direction. Note that, FIG. 2 shows only one fitting piece 352 of the two fitting pieces 352. Further, on the upper end of the folded part 35, two protrusions 351 protruding upward are respectively arranged in the positions opposing to each other in the right-left direction. When the upper container 2 is assembled with the lower container 3, the protrusions 351 are interposed in a space formed with the folded part 25 of the upper container 2, and this restrains movement of the upper container 2 in the right-left direction with respect to the lower container 3.

(Configuration of Cover 4)

The following describes a configuration of the cover 4 with reference to FIG. 1 and FIG. 2.

The cover 4 includes an opening part 41, side wall parts 42 provided to both sides respectively in the right-left direction of the opening part 41, a front wall part 43 provided to the front side of the opening part 41, a rear wall part 44 provided to the rear side of the opening part 41, and an overhanging part 45 overhanging downwardly from the lower ends of the side wall parts 42, the front wall part 43 and the rear wall part 44. In the present embodiment, the side wall parts 42, the front wall part 43, the rear wall part 44, and the overhanging part 45 are integrally formed. Further, the cover 4 does not have a bottom face and penetrates in the up-down direction.

As shown in FIG. 2, the overhanging part 45 is formed with a fitting piece 450, formed with a penetration hole 450a, overhanging downwardly, in respective positions opposing each other in the right-left direction. Note that, FIG. 2 shows only one fitting piece 450 of the two fitting pieces 450. The penetration hole 450a is to be fitted with the projecting part 352a of the lower container 3 when the cover 4 is assembled with respect to the lower container 3 assembled with the upper container 2. In this embodiment, the penetration hole 450a is formed in a shape of a cat face.

(Configuration of Tray 5)

Figure 5:
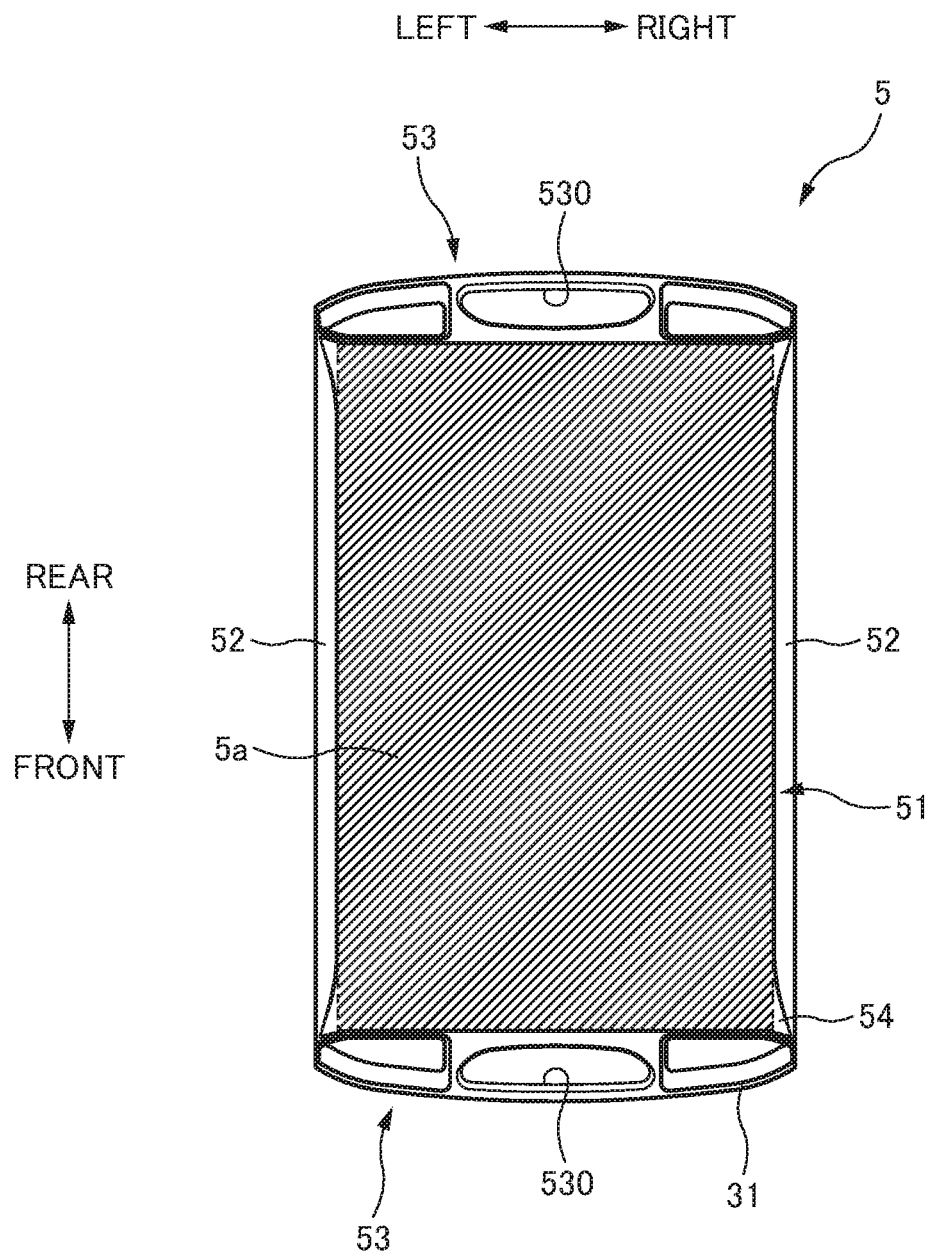
FIG. 5 is a plan view that shows one configuration example of a tray.
Figure 6:
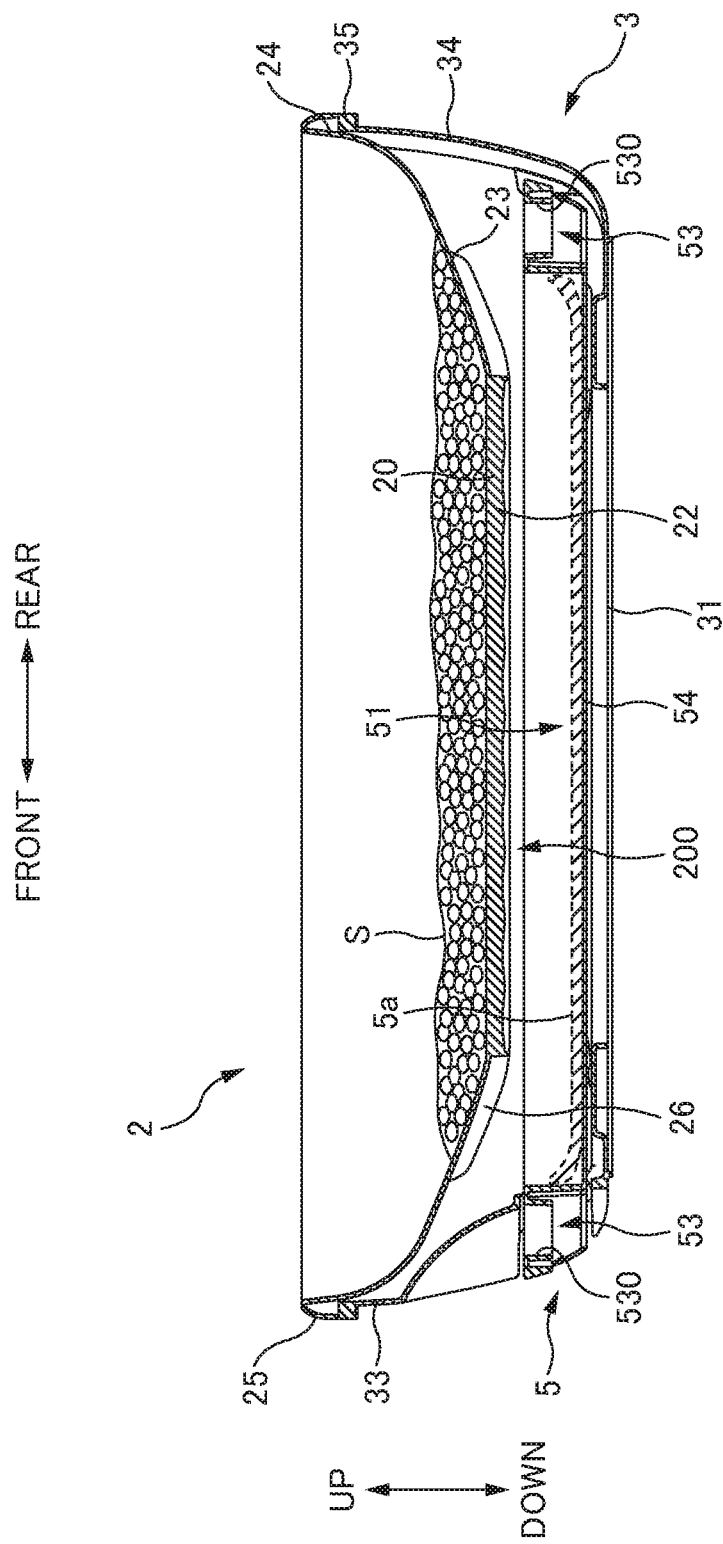
FIG. 6 is a cross-sectional view that shows a state where an upper container, a lower container, and a tray are combined.

The following describes a configuration of the tray 5 with reference to FIG. 5 and FIG. 6 in addition to FIG. 1 and FIG. 2.

FIG. 5 is a plan view that shows one configuration example of the tray 5. FIG. 6 is a cross-sectional view that shows a state where the upper container 2, the lower container 3, and the tray 5 are combined.

The tray 5 is a box-shaped member with its thickness in the up-down direction formed thinly and its upper side opened. The tray 5 includes a bottom part 54, side wall parts 52 arranged vertically in both sides in the right-left direction of the bottom part 54, and handle parts 53 provided in both sides in the front-rear direction of the bottom part 54, and includes an absorbent body setting part 51 on which an absorbent body 5a that absorbs urine and the like is set. Note that, the absorbent body 5a is shown by diagonal lines in FIG. 2, and by broken lines and diagonal lines in FIG. 5.

This tray 5 is configured such that it can be housed in the housing space 36 of the lower container 3 with the front and the rear of the tray 5 reversed, because the respective handle parts 53 are provided in both sides in the front-rear direction. The handle part 53 is formed with a handhold hole 530 for holding with hands when putting in or taking out the tray 5 to/from the housing space 36 of the lower container 3.

As shown in FIG. 6, inside the upper container 2, an excrement treatment material S is scattered in the bottom part 20 over the outer peripheral part 23. Urine excreted from above the excrement treatment material S passes through the urine passing area 200 of the upper container 2 to be absorbed with the absorbent body 5a set in the absorbent body setting part 51. The absorbent body 5a is an absorbent sheet formed of a liquid absorbent material such as a pulp fiber or a superabsorbent polymer, for example. In FIG. 6, the absorbent body 5a is shown by dashed lines and diagonal lines.

In a case where the tray 5 is inclined in the housing space 36 of the lower container 3 when the tray 5 is moved in the front-rear direction by grasping one handle part 53 of the two handle parts 53, there is a possibility that the other handle part 53 and the upper end part of the side wall part 52 contacts the bottom part 20 of the upper container 3. In this case, there is a possibility that grime attached to the bottom part 20 attaches to the tray 5. In this embodiment, as shown in FIG. 6, because the plate member 26 protruding toward the tray 5 is provided on the back side of the upper container 3, the other handle part 53 and the upper end part of the side wall part 52 do not directly contact the bottom part 20, and attaching of the grime attached to the bottom part 20 to the tray 5 can be restrained.

<Configurations of Cross Rib 21 and Longitudinal Rib 22>

The following describes configurations of the cross ribs 21 and the longitudinal ribs 22 with reference to FIG. 7 to FIG. 10.

Figure 7A:
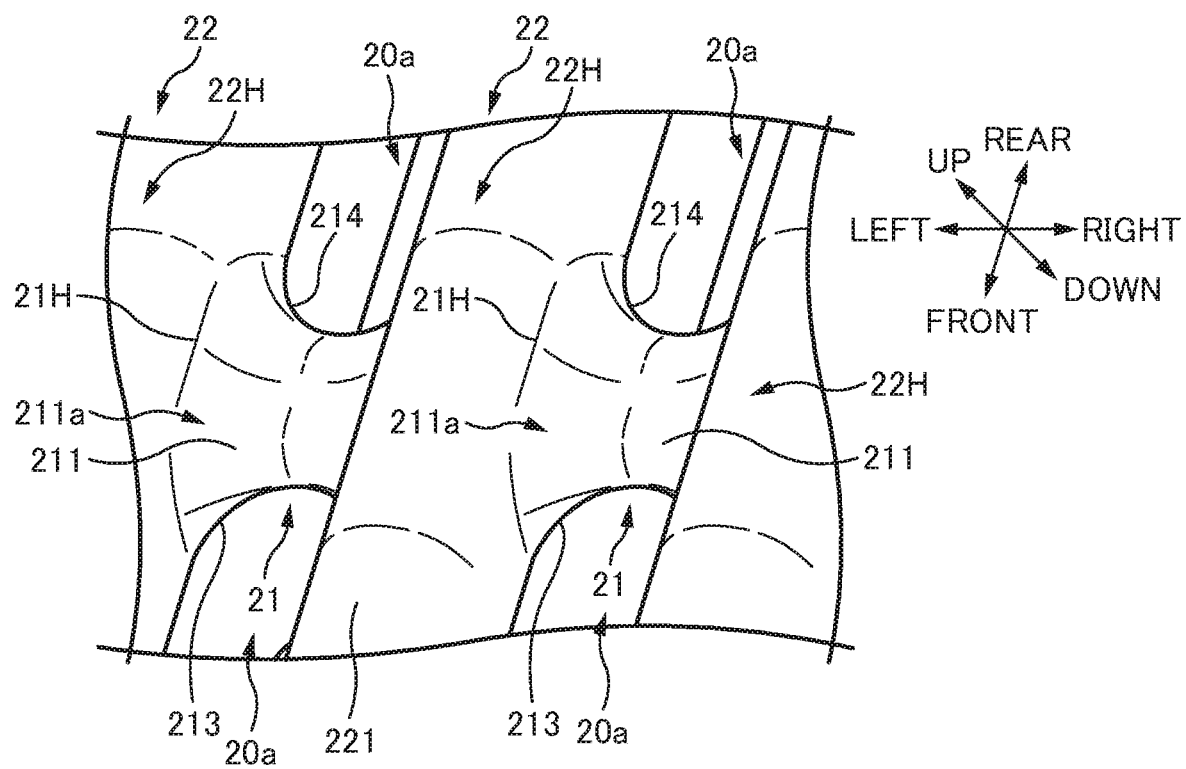
FIG. 7A is a partially enlarged perspective view.
Figure 7B:
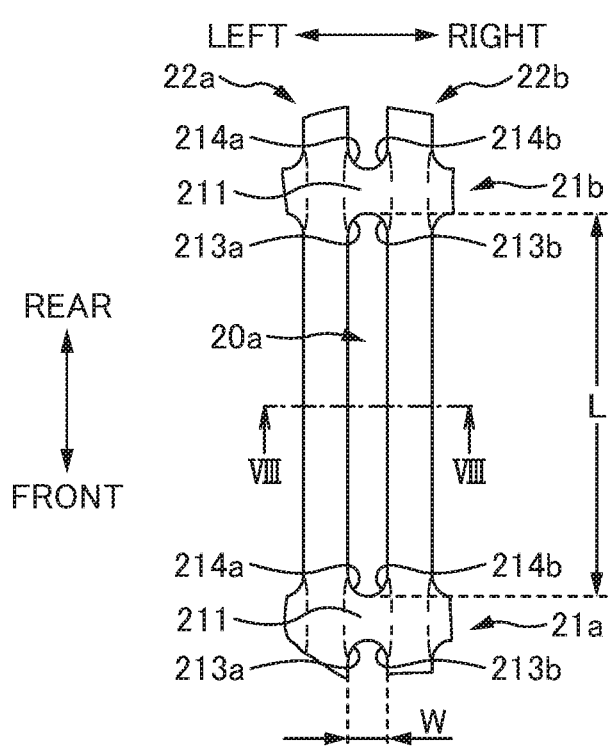
FIG. 7B is a partially enlarged plan view.
Figure 8:
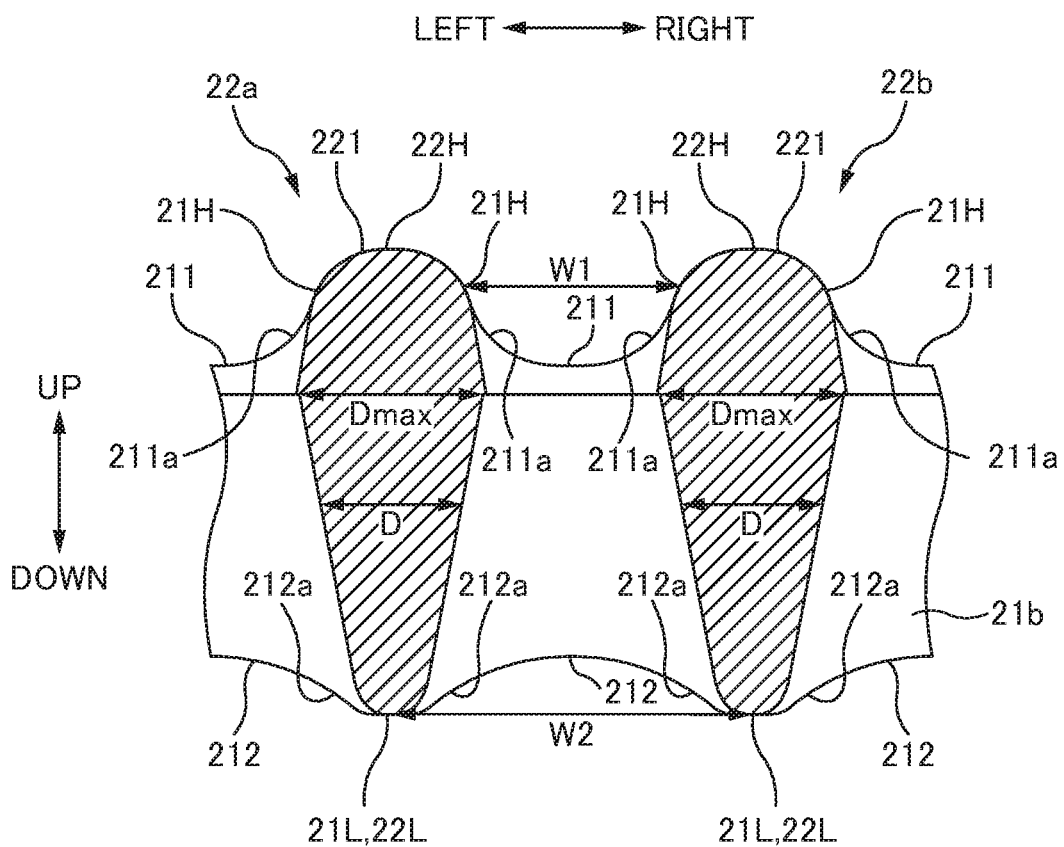
FIG. 8 is a cross-sectional view taken along a line VIII-VIII in FIG. 7B.
Figure 9A:
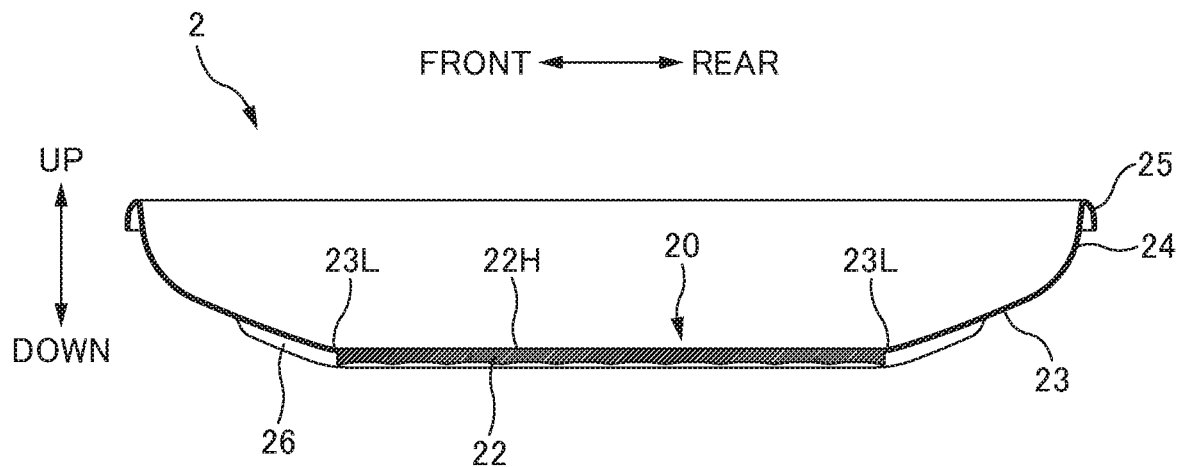
FIG. 9A is a cross-sectional view taken along a line IXA-IXA in FIG. 3A.
Figure 9B:
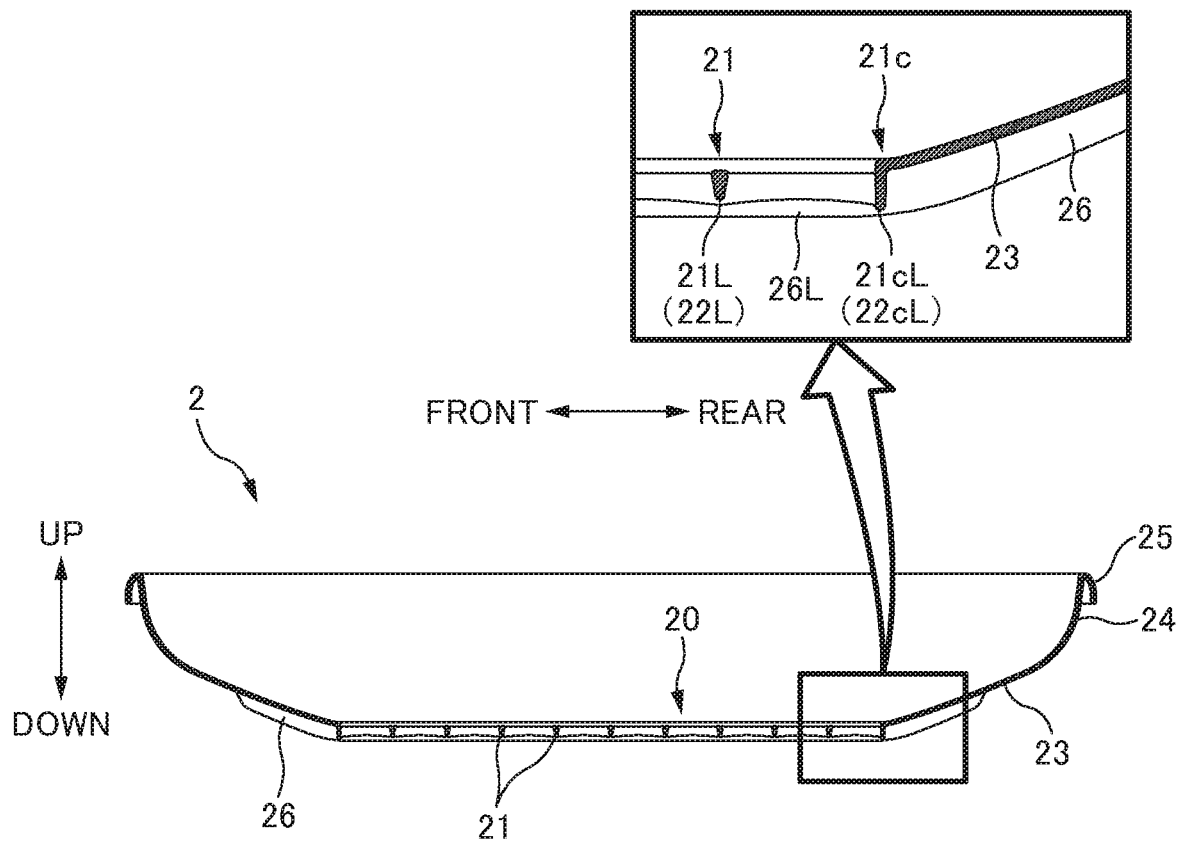
FIG. 9B is a cross-sectional view taken along a line IXB-IXB in FIG. 3A.
Figure 10A:
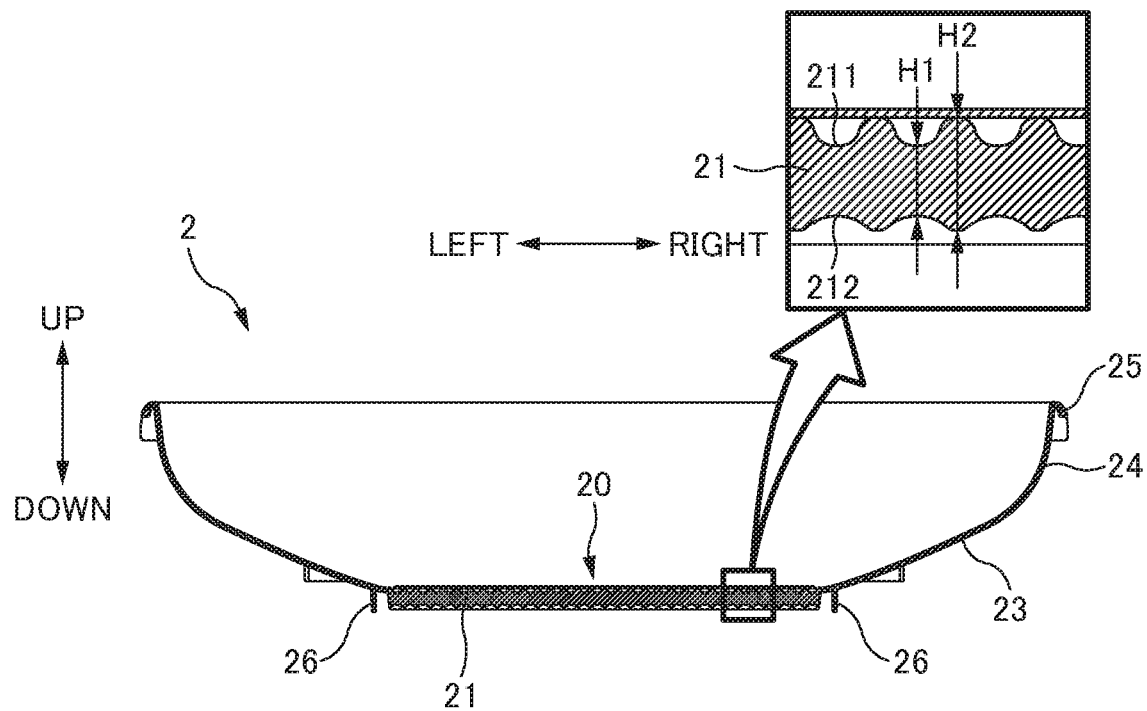
FIG. 10A is a cross-sectional view taken along a line XA-XA in FIG. 3A.
Figure 10B:
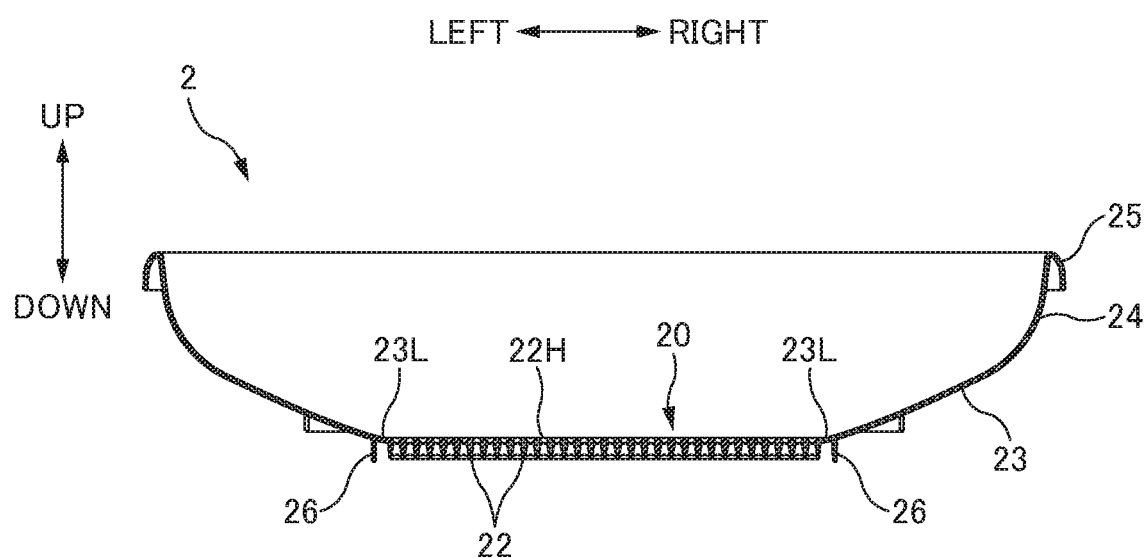
FIG. 10B is a cross-sectional view taken along a line XB-XB in FIG. 3A.

FIG. 7A and FIG. 7B show one configuration example of the cross ribs 21 and the longitudinal ribs 22, FIG. 7A is a partially enlarged perspective view, and FIG. 7B is a partially enlarged plan view. FIG. 8 is a cross-sectional view taken along a line VIII-VIII in FIG. 7B. FIG. 9A is a cross-sectional view taken along a line IXA-IXA in FIG. 3A, and FIG. 9B is a cross-sectional view taken along a line IXB-IXB in FIG. 3A. FIG. 10A is a cross-sectional view taken along a line XA-XA in FIG. 3A, and FIG. 10B is a cross-sectional view taken along a line XB-XB in FIG. 3A.

Note that, in the following, among the two cross ribs 21 adjacent to one another, the cross rib 21 positioned ahead is referred to as a "front-side cross rib 21*a*," and the cross rib 21 positioned behind is referred to as a "rear-side cross rib 21*b*." Further, as necessary, among the two longitudinal ribs 22 adjacent to one another, the longitudinal rib 22 positioned to the left side is referred to as a "left-side longitudinal rib 22*a*," and the longitudinal rib 22 positioned to the right side is referred to as a "right-side longitudinal rib 22*b*." Further, in this embodiment, the cross rib 21 and the longitudinal rib 22 are integrally shaped. This is not necessary, however. The cross rib 21 and the longitudinal rib 22 may be shaped separately to be joined to one another.

As shown in FIG. 7A and FIG. 8, the cross rib 21 connects a plurality of longitudinal ribs 22 provided at intervals in the right-left direction. On the upper side of the part of the cross rib 21 connected to the longitudinal rib 22, an upper-side inclined surface 211*a* inclined obliquely downward from the longitudinal rib 22 is provided.

In this embodiment, on the upper side of the cross rib 21, a first upper-side curved surface 211 curving downward is provided over between the two longitudinal ribs 22 adjacent to one another. A part of this first upper-side curved surface 211 is the upper-side inclined surface 211*a*. Note that, the first upper-side curved surface 211 is not necessarily provided on the upper side of the cross rib 21, and it is only necessary to provide at least the upper-side inclined surface 211*a*.

Further, an uppermost part 21H of the cross rib 21 is positioned below an uppermost part 22H of the longitudinal rib 22. In other words, the uppermost part 22H of the longitudinal rib 22 is provided in a position higher than that of the uppermost part 21H of the cross rib 21. Here, the uppermost part 21H of the cross rib 21 corresponds to a part corresponding to a border with the longitudinal rib 22 of the upper-side inclined surface 211*a*. The uppermost part 22H of the longitudinal rib 22 corresponds to a part protruding further upward than the uppermost part 21H of the cross rib 21.

As shown in FIG. 7B, in this embodiment, a distance L between the two cross ribs 21 adjacent to one another (the front-side cross rib 21*a* and the rear-side cross rib 21*b*) is longer than a distance W between the two longitudinal ribs 22 adjacent to one another (the left-side longitudinal rib 22*a* and the right-side longitudinal rib 22*b*) (L>W). Accordingly, the hole 20*a* whose outer periphery is surrounded with the cross ribs 21*a* and 21*b* and the longitudinal ribs 22*a* and 22*b* has an elongated shape along the longitudinal rib 22, that is, along the front-rear direction. This facilitates cleaning, for example, by brushing along the longitudinal direction of the hole 20*a* (the front-rear direction of the toilet for an animal 1) when cleaning the upper container 2.

Accordingly, when cleaning the toilet for an animal 1, for example, brushing is often performed in the front-rear direction. At this time, as described above, the cross rib 21 located along the direction intersecting with the longitudinal rib 22 (the right-left direction) does not protrude to the upper side with respect to the longitudinal rib 22. This can restrain a situation where the brush or the like catches on the cross rib 21, to facilitate the brushing and the like and to further facilitate the cleaning. Note that, the hole 20*a* does not necessarily have the elongate shape along the longitudinal rib 22.

Furthermore, in the cross rib 21, because the upper-side inclined surface 211*a* is provided on the upper side of the part connected to the longitudinal rib 22, an angle of the part where the cross rib 21 is connected to the longitudinal rib 22 on the vertical plane is obtuse. This causes the grime such as urine to be less likely to accumulate on this connecting part (the boundary part between the cross rib 21 and the longitudinal rib 22) and facilitates, for example, the brushing to facilitate the cleaning, compared with a case where the angle of the part where the cross rib 21 is connected to the longitudinal rib 22 is orthogonal or acute. Note that, the "vertical plane" is a surface constituted by the up-down direction and the right-left direction.

Further, in this embodiment, because the first upper-side curved surface 211 including the upper-side inclined surface 211*a* is provided on the upper side of the cross rib 21, the whole upper side of the cross rib 21 becomes a smooth surface. Thus, the grime such as urine is further less likely to accumulate, and the brushing and the like is performed over the whole first upper-side curved surface 211 to further facilitate the cleaning.

Similarly, as shown in FIG. 8, a lower-side inclined surface 212*a* inclined obliquely upward from the longitudinal rib 22 is provided on the lower side of the part connected to the longitudinal rib 22 of the cross rib 21. Thus, also on a back side of the bottom part 20, since an angle of a part where the cross rib 21 is connected to the longitudinal rib 22 becomes obtuse, compared with a case where the angle of the part where the cross rib 21 is connected to the longitudinal rib 22 is orthogonal or acute, the grime such as urine becomes less likely to accumulate on this connecting part (the boundary part between the cross rib 21 and the longitudinal rib 22), and the brushing and the like is easily performed to facilitate the cleaning.

Note that, the lower-side inclined surface 212*a* does not necessarily have to be provided on the lower side of the part connected to the longitudinal rib 22 of the cross rib 21, and it is only necessary to at least provide the upper-side inclined surface 211*a* on the upper side of the part connected to the longitudinal rib 22 of the cross rib 21.

In this embodiment, on the lower side of the cross rib 21, a first lower-side curved surface 212 curving upward is provided over between the two longitudinal ribs 22 adjacent to one another. A part of this first lower-side curved surface 212 is the lower-side inclined surface 212*a*.

This also makes the whole lower side of the cross rib 21 a smooth surface. Thus, the grime such as urine is further less likely to accumulate, and brushing and the like can be performed over the whole first lower-side curved surface 212, to also facilitate the cleaning on the back side (the lower side). Note that, the first lower-side curved surface 212 is not necessarily provided on the lower side of the cross rib 21.

As shown in FIG. 7A and FIG. 7B, when the cross rib 21 and the longitudinal rib 22 are viewed along the up-down direction, on the part connected to the longitudinal rib 22 of the cross rib 21, a front-side curved surface 213 and a rear-side curved surface 214 curving toward the longitudinal rib 22 are provided.

In this embodiment, as shown in FIG. 7B, a front-side curved surface 213*a* curving toward the left-side longitudinal rib 22*a* and a front-side curved surface 213*b* curving toward the right-side longitudinal rib 22*b* are continuously formed. Thus, on the front side of the cross rib 21, an arc face is formed from the left-side longitudinal rib 22*a* over the right-side longitudinal rib 22*b*. Similarly, on the rear side of the cross rib 21, a rear-side curved surface 214*a* curving toward the left-side longitudinal rib 22*a* and a rear-side curved surface 214*b* curving toward the right-side longitudinal rib 22*b* form an arc face.

Accordingly, the hole 20*a* whose outer periphery is surrounded with the front-side cross rib 21*a*, the rear-side cross rib 21b, the left-side longitudinal rib 22a, and the right-side longitudinal rib 22b has a shape rounded with the front-side curved surfaces 213a and 213b of the rear-side cross rib 21b and the rear-side curved surfaces 214a and 214b of the front-side cross rib 21a. This makes the connecting part of the cross rib 21 to the longitudinal rib 22 a smooth curved surface, compared with a case where the cross rib 21 is orthogonally connected to the longitudinal rib 22, on a horizontal surface. Thus, the grime such as urine becomes less likely to accumulate on this connecting part. Here, the "horizontal surface" is referred to as a surface constituted with the front-rear direction and the right-left direction.

Note that, the front-side curved surface 213 and the rear-side curved surface 214 are not necessarily provided on the part connected to the longitudinal rib 22 on the cross rib 21. For example, when the urine passing area 200 is viewed along the up-down direction, a plurality of holes 20a may be formed into rectangular shapes.

As shown in FIG. 9B, the cross ribs 21c positioned in both sides in the front-rear direction among the plurality of cross ribs 21 protrude downward with respect to the other cross ribs 21, and the plate members 26 provided on the outer peripheral part 23 protrude downward further with respect to the cross ribs 21c positioned to both sides in the front-rear direction. That is, a relationship in dimension (height) in the up-down direction between lowermost parts 21cL of the cross ribs 21c positioned in both sides in the front-rear direction, lowermost parts 21L of the other cross ribs 21, and lowermost parts 26L of the plate members 26 is such that the dimension decreases downward in order of the lowermost parts 21L of the other cross ribs 21, the lowermost parts 21cL of the cross ribs 21c positioned in both sides in the front-rear direction, and the lowermost parts 26L of the plate members 26.

Here, the lowermost part 21L (including the lowermost part 21cL) of the cross rib 21 corresponds to a part corresponding to a border with the longitudinal rib 22 of the lower-side inclined surface 212a. In this embodiment, a position in the up-down direction of this lowermost part 21L is the same as a position in the up-down direction of a lowermost part 22L (including a lowermost part 22cL) of the longitudinal rib 22. Note that, the lowermost part 22L of the longitudinal rib 22 is a part most protruding downward of the longitudinal rib 22.

As described above, when cleaning the toilet for an animal 1, the brushing and the like is often performed in the front-rear direction that is a direction in which the longitudinal rib 22 extends. Since the cross ribs 21c positioned in both sides in the front-rear direction protrude downward with respect to the other cross ribs 21, the contamination delaminated from the bottom part 20 is likely to contact the cross ribs 21c positioned in both sides in the front-rear direction to fall to the lower side (the lower container 3 side). This can restrain the scatter of the contamination in the front-rear direction.

Then, the plate members 26 further protrude downward with respect to the cross ribs 21c that most protrude downward and are positioned in both sides in the front-rear direction among the plurality of cross ribs 21. Thus, for example, even when the upper container 2 is placed on the floor or the like, the lowermost part 26L of the plate member 26 contacts the floor or the like to cause the bottom part 20 not to directly contact the floor or the like. This can restrain the grime attached to the bottom part 20 from attaching to the floor.

Further, as described above, even in the case where the tray 5 is inclined in the housing space 36 when the tray 5 is put in or out of the lower container 3 by grasping one handle part 53 of the tray 5, because the plate member 26 protrudes downward with respect to the cross rib 21, the other handle part 53 contacts the plate member 26. This can restrain the other handle part 53 from directly contacting the cross rib 21. This can restrain the grime attached to the bottom part 20 from attaching to the handle part 53 of the tray 5, and can keep the handle part 53 clean.

Accordingly, it is preferable that the cross ribs 21c positioned in both sides in the front-rear direction protrude downward with respect to the other cross ribs 21, and the plate members 26 further protrude downward with respect to the cross ribs 21c positioned in both sides in the front-rear direction, however, they do not necessarily have to be formed like this.

As shown in FIG. 7A and FIG. 8, on the upper side of the longitudinal rib 22, a second upper-side curved surface 221 curving upward is provided. This second upper-side curved surface 221 is continuous with the upper-side inclined surface 211a of the cross rib 21. Accordingly, in this embodiment, the first upper-side curved surface 211 of the cross rib 21 is continuous with the second upper-side curved surface 221 of the longitudinal rib 22.

This causes urine or the like to be less likely to accumulate on the upper part of the longitudinal rib 22, and to be likely to fall down. Then, the second upper-side curved surface 221 of the longitudinal rib 22 is smoothly continuous with the upper-side inclined surface 211a of the cross rib 21. This can restrain the situation where grime such as urine accumulates on the boundary part between the cross rib 21 and the longitudinal rib 22. Note that, the second upper-side curved surface 221 continuous with the first upper-side curved surface 211 of the cross rib 21 is not necessarily provided on the upper side of the longitudinal rib 22.

Similarly, as shown in FIG. 8, a second lower-side curved surface 222 curving downward is provided on the lower side of the longitudinal rib 22. This second lower-side curved surface 222 is continuous with the lower-side inclined surface 212a of the cross rib 21. Accordingly, in the present embodiment, the first lower-side curved surface 212 of the cross rib 21 is continuous with the second lower-side curved surface 222 of the longitudinal rib 22.

Since the second lower-side curved surface 222 is provided also on the lower side of the longitudinal rib 22, urine or the like that has flowed down the longitudinal rib 22 from above becomes likely not to accumulate on the lower part of the longitudinal rib 22, thus directly flowing down to the lower container 3 side. Then, since the second lower-side curved surface 222 of the longitudinal rib 22 is smoothly continuous with the first lower-side curved surface 212 of the cross rib 21, similarly to the upper side of the bottom part 20, also on the lower side (the back side), the situation where the grime such as urine accumulates on the boundary part between the cross rib 21 and the longitudinal rib 22 can be restrained.

As shown in FIG. 8, to the lower side of the longitudinal rib 22, a dimension D in a width direction (the right-left direction) intersecting with the longitudinal direction (the front-rear direction) of the longitudinal rib 22 and the up-down direction decreases toward the lower end. Note that, this dimension D does not necessarily decrease toward the lower end of the longitudinal rib 22. Thus, urine or the like, however, that has flowed down the longitudinal rib 22 from above accumulates on the lowermost part 22L to become a large droplet, thus being likely to fall down with its own weight, and improves drainage.

In this embodiment, the dimension D in the width direction of the longitudinal rib 22 gradually increases downward from the uppermost part 22H, and gradually decreases from a part (Dmax) where the dimension D is largest toward the lowermost part 22L that is the lower end. In this case, a distance W1 between the uppermost part 21H of the cross rib 21 on the part connected to the left-side longitudinal rib 22a and the uppermost part 21H of the cross rib 21 on the part connected to the right-side longitudinal rib 22b is set shorter than a distance W2 between the lowermost part 21L of the cross rib 21 on the part connected to the left-side longitudinal rib 22a and the lowermost part 21L of the cross rib 21 on the part connected to the right-side longitudinal rib 22a (W1<W2). The relationship between the distance W1 between the uppermost parts 21H and the distance W2 between the lowermost parts 21L, however, does not necessarily have to be W1<W2.

As shown in FIG. 9A and FIG. 10B, a position in the up-down direction of the uppermost part 22H of the longitudinal rib 22 is the same as a position in the up-down direction of a lowest part 23L of the outer peripheral part 23. That is, the uppermost part 22H of the longitudinal rib 22 does not protrude upward with respect to the lowest part 23L of the outer peripheral part 23.

Thus, even in a case where a force is applied to the boundary part between the bottom part 20 and the outer peripheral part 23 from the upper side to the lower side, for example, when the upper container 2 is being cleaned and when the animal gets on the boundary part of the upper container 2, the force is not applied to only the longitudinal rib 22, and the force is distributed and applied to the longitudinal rib 22 and the outer peripheral part 23. Thus, having a structure where an excessive force is not applied to the bottom part 20 ensures strength of the bottom part 20.

Further, if the uppermost part 22H of the longitudinal rib 22 protruded upward with respect to the lowest part 23L of the outer peripheral part 23, urine or the like that goes down the outer peripheral part 23 could be dammed with the longitudinal rib 22 and may remain. In the present embodiment, however, because the uppermost part 22H of the longitudinal rib 22 does not protrude upward with respect to the lowest part 23L of the outer peripheral part 23, urine or the like is allowed to smoothly flow into the plurality of holes 20a. Note that, the position in the up-down direction of the uppermost part 22H of the longitudinal rib 22 is not necessarily the same as the position in the up-down direction of the lowest part 23L of the outer peripheral part 23.

As shown in FIG. 10A, in the cross rib 21, a dimension H1 of a part whose length in the up-down direction is shortest is set larger than a half of a dimension H2 of a part whose length in the up-down direction on the longitudinal rib 22 is longest (H1>½×H2). Here, the "dimension H1 of the part whose length in the up-down direction on the cross rib 21 is shortest" is a distance in the up-down direction between a part curving downmost of the first upper-side curved surface 211 and a part curving uppermost of the first lower-side curved surface 212. Further, the "dimension H2 of the part whose length in the up-down direction on the longitudinal rib 22 is longest" is a distance in the up-down direction between the uppermost part 22H and the lowermost part 22L.

This can restrain the force applied in the up-down direction to the cross rib 21 and the longitudinal rib 22 from damaging the part whose length in the up-down direction is shortest that is a part whose strength is lowest of the cross rib 21. Note that, the dimension H1 of the part whose length in the up-down direction on the cross rib 21 is shortest is not necessarily set larger than the half of the dimension H2 whose length in the up-down direction on the longitudinal rib 22 is longest.

<Relationship Between Cross Rib 21 and Longitudinal Rib 22, and Excrement Treatment Material S>

Figure 11A:
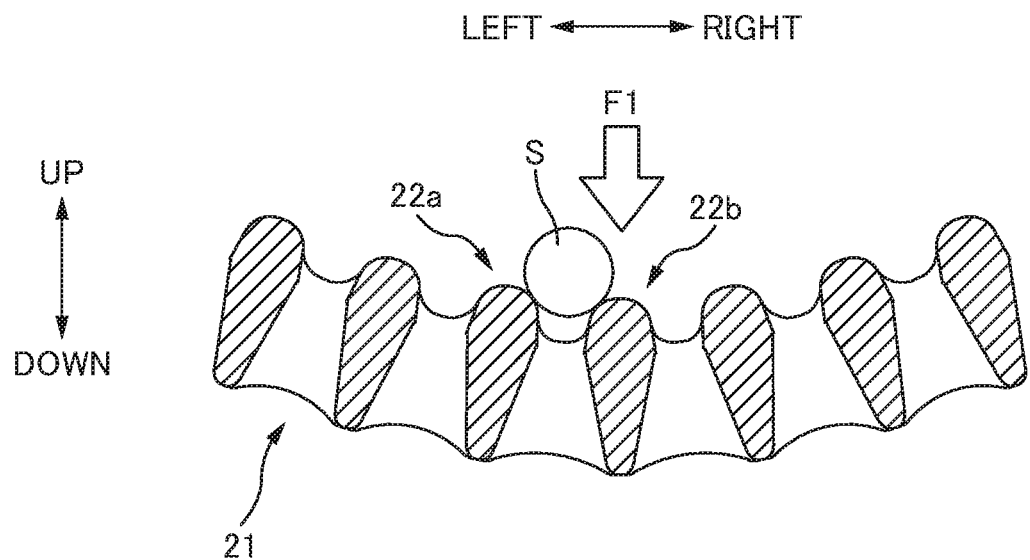
FIG. 11A shows a state where the force is applied downward from above.
Figure 11B:
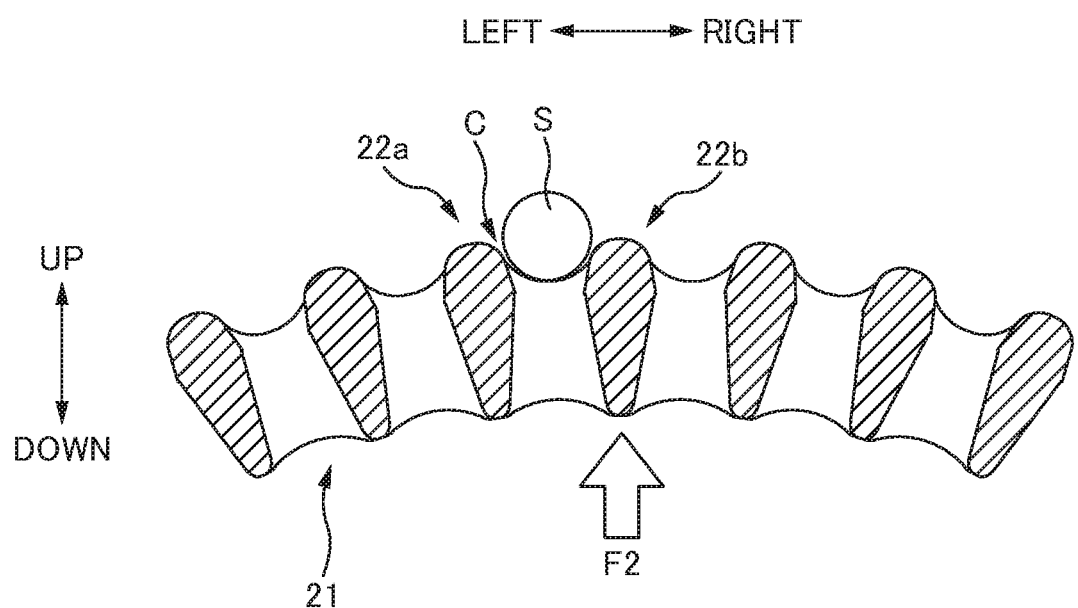
FIG. 11B shows a state where the force is applied upward from below.

The following describes a relationship between the cross rib and the longitudinal rib 22, and the excrement treatment material S with reference to FIG. 11A and FIG. 11B.

FIG. 11A and FIG. 11B show states of the cross rib 21 and the longitudinal rib 22 when the force is applied in the up-down direction, FIG. 11A shows a state where a force F1 is applied downward from above, and FIG. 11B shows a state where a force F2 is applied upward from below.

As described above, the granular excrement treatment material S is scattered on the urine passing area 200 (the bottom part 20) of the upper container 2. When using the toilet for an animal 1, there is a case where the excrement treatment material S may get stuck in a void formed above the first upper-side curved surface 211 of the cross rib 21 and the plurality of holes 20a. When cleaning, effort is required for a work to remove the stuck excrement treatment material S.

Because the upper container 2 according to the present embodiment is formed by molding resin, as shown in FIG. 11A and FIG. 11B, the upper container 2 bends in the up-down direction when the force is applied to the urine passing area 200. For example, when the animal gets on the bottom part 20, or when the upper side of the urine passing area 200 is cleaned by brushing and the like from the upper side of the bottom part 20, as shown in FIG. 11A, the force F1 is applied to the plurality of cross ribs 21 and the plurality of longitudinal ribs 22 from the upward direction to the downward direction. Further, for example, when the lower side of the urine passing area 200 is cleaned by brushing and the like from the back side of the bottom part 20, as shown in FIG. 11B, the force F2 is applied to the plurality of cross ribs 21 and the plurality of longitudinal ribs 22 from the downward direction to the upward direction.

when the force F1 is applied to the plurality of cross ribs 21 and the plurality of longitudinal ribs 22 from the upward direction to the downward direction, as shown in FIG. 11A, the cross rib 21 curves such that a center part in the right-left direction protrudes to the downward direction. At this time, because the left-side longitudinal rib 22a and the right-side longitudinal rib 22b approach one another, in the cross rib 21, a distance in the right-left direction between the uppermost part 21H to a side of the part connected to the left-side longitudinal rib 22a and the uppermost part 21H to a side of the part connected to the right-side longitudinal rib 22b becomes short.

Accordingly, an interval between the two longitudinal ribs 22 adjacent to one another (the left-side longitudinal rib 22a and the right-side longitudinal rib 22b) becomes small on the upper side of the cross rib 21. This can restrain the excrement treatment material S from getting stuck in the void formed on the upper side of the first upper-side curved surface 211 of the cross rib 21 and the hole 20a.

Conversely, when the force F2 is applied to the plurality of cross ribs 21 and the plurality of longitudinal ribs 22 from the downward direction to the upward direction, as shown in FIG. 11B, the cross rib 21 curves such that the center part in the right-left direction protrudes to the upward direction. At this time, because the left-side longitudinal rib 22a and the right-side longitudinal rib 22b move away from one another, in the cross rib 21, the distance in the right-left direction between the uppermost part 21H to the side of the part connected to the left-side longitudinal rib 22a and the uppermost part 21H to the side of the part connected to the right-side longitudinal rib 22b becomes long.

Accordingly, the interval between the two longitudinal ribs 22 adjacent to one another (the left-side longitudinal rib 22a and the right-side longitudinal rib 22b) becomes large on the upper side of the cross rib 21. Thus, a clearance C is formed between the excrement treatment material S that has got stuck in the void formed on the upper side of the first upper-side curved surface 211 of the cross rib 21 and the hole 20a, and the longitudinal ribs 22 (the left-side longitudinal rib 22a and the right-side longitudinal rib 22b), thus the excrement treatment material S can be easily removed.

OTHER EMBODIMENTS

The foregoing embodiments are intended to facilitate the understanding of the present invention but not to limit the invention. It is needless to say that modifications and improvements of the present invention are possible without departing from the scope of the invention, and equivalents thereof are also encompassed by the invention.

In the above-described embodiment, the toilet for an animal 1 includes the four members: the upper container 2, the lower container 3, the cover 4, and the tray 5. The toilet for an animal 1, however, is not necessarily constituted by these four members. It is only necessary that the toilet for an animal 1 includes at least the upper container 2 and the lower container 3.

REFERENCE SIGNS LIST 1 toilet for an animal
2 upper container
3 lower container
20a hole
21, 21a, 21b, 21c cross rib (first rib)
21H, 22H uppermost part
22, 22a, 22b longitudinal rib (second rib)
outer peripheral part
26 plate member
211 first upper-side curved surface (first curved surface)
211a upper-side inclined surface (inclined surface)
212 first lower-side curved surface (lower-side curved surface)
212a lower-side inclined surface
213, 213a, 213b front-side curved surface (curved surface)
214, 214a, 214b rear-side curved surface (curved surface)
221 second upper-side curved surface (second curved surface)

The invention claimed is:

1. A toilet for an animal, said toilet having an up-down direction, a transverse direction, and a longitudinal direction, said toilet comprising:
an upper container defined by a box-shaped member with an open upper side, the upper container including
a bottom part including a plurality of holes that penetrate in the up-down direction, a plurality of first ribs, and a plurality of second ribs,
an outer peripheral part on an outer periphery of the bottom part,
a side face extending vertically upward from a peripheral edge of the outer peripheral part, and
a folded part where an upper end of the side face is folded back and downwardly;
a lower container provided below the upper container; and
a cover including an opening configured to allow the animal to enter and exit,
wherein
an outer periphery of each of the plurality of holes is surrounded with
respective first ribs among the plurality of first ribs which extend along a first direction intersecting with the up-down direction and
respective second ribs among the plurality of second ribs which extend along a second direction intersecting with the up-down direction and the first direction,
an uppermost part of each of the plurality of second ribs is higher than an uppermost part of each of the plurality of first ribs, and
each of the plurality of first ribs has a connecting part connected to adjacent second ribs among the plurality of second ribs and provided with an inclined surface inclined obliquely downward from the adjacent second ribs,
the plurality of first ribs and the plurality of second ribs are integral with the upper container,
the bottom part of the upper container is a lowermost part of the upper container,
the lower container is a box-shaped member with an open upper side, and includes
a bottom part having opposing ends in the transverse direction,
side wall parts arranged vertically upward from the opposing ends of the bottom part and defining end portions of the lower container,
a front wall part arranged vertically upward from a front end of the bottom part,
a rear wall part arranged vertically upward from a rear end of the bottom part,
a folded part in which upper ends of the side wall parts, the front wall part, and the rear wall part are folded back downwardly, and
protrusions protruding upward from an upper end of the folded part, said protrusions being respectively provided at the end portions of the lower container and opposing to each other in the transverse direction which is perpendicular to the longitudinal direction,
when the upper container is assembled with the lower container, the protrusions are interposed in a space formed by the folded part of the upper container to restrain movement of the upper container in the transverse direction with respect to the lower container,
the cover has a penetration hole,
the folded part of the lower container has
the protrusions, and
a projecting part extending in the transverse direction and configured to fit into the penetration hole when the cover is arranged over the upper container,
the upper container is arranged over the lower container, and
the cover and the upper and lower containers are assembled together.

2. The toilet for an animal according to claim 1, wherein an upper side of said each of the plurality of first ribs is provided with a first curved surface curving downward between the adjacent second ribs, and
a portion of the first curved surface is the inclined surface.

3. The toilet for an animal according to claim 2, wherein an upper side of each of the adjacent second ribs is provided with a second curved surface curving upward, and
the second curved surface is continuous with the inclined surface of said each of the plurality of first ribs.

4. The toilet for an animal according to claim 1, wherein
each of the plurality of second ribs include a lower side where a dimension of said each second rib in the first direction decreases downward toward a lower end of said each second rib.

5. The toilet for an animal according to claim 1, wherein a distance between adjacent first ribs among the plurality of first ribs is longer than a distance between adjacent second ribs among the plurality of second ribs.

6. The toilet for an animal according to claim 1, wherein the uppermost part of each of the plurality of second ribs is in a same plane as a lowest part of the outer peripheral part of the upper container.

7. The toilet for an animal according to claim 1, wherein when the toilet is viewed along the up-down direction, the connecting part of each of the first ribs is provided with a curved surface curving toward the adjacent second ribs.

8. The toilet for an animal according to claim 1, wherein the plurality of first ribs includes first end ribs positioned on both ends of the plurality of first ribs, and
the first end ribs protrude further downward than other first ribs among the plurality of first ribs.

9. The toilet for an animal according to claim 8, wherein
the outer peripheral part of the upper container is provided continuously from the bottom part,
the outer peripheral part includes plate members extending along the second direction and provided on both sides of the plurality of second ribs, and
the plate members protrude further downward than the first end ribs.

10. The toilet for an animal according to claim 1, wherein
a dimension of a shortest section of each of the plurality of first ribs in the up-down direction is larger than half of a dimension of a longest section of each of the plurality of second ribs in the up-down direction.

11. The toilet for an animal according claim 1, wherein
the connecting part of said each of the plurality of first ribs is provided with a lower-side inclined surface inclined obliquely upward from the adjacent second ribs.

12. The toilet for an animal according to claim 11, wherein
a lower side of said each of the plurality of first ribs is provided with a lower-side curved surface curving upward between the adjacent second ribs, and
a portion of the lower-side curved surface is the lower-side inclined surface.

13. The toilet for an animal according to claim 1, wherein
each of the adjacent second ribs includes
an upper side where a dimension of said adjacent second rib in the first direction gradually increases downward from the uppermost part of said adjacent second rib, and
a lower side where the dimension of said adjacent second rib in the first direction decreases, from a part which has a largest dimension of said adjacent second rib in the first direction, toward a lowermost part of said adjacent second rib, and
the part that has the largest dimension of said adjacent second rib is a boundary between the upper side and the lower side of said adjacent second rib.

14. The toilet for an animal according to claim 1, wherein the protrusions are completely covered when the cover and the upper and lower containers are assembled together.

\* \* \* \* \*